United States Patent
Hokari et al.

(10) Patent No.: US 12,038,191 B2
(45) Date of Patent: Jul. 16, 2024

(54) AIR CONDITIONER TIMING ESTIMATION CONTROLLER USING MACHINE LEARNING MODEL

(71) Applicant: Mitsubishi Electric Corporation, Tokyo (JP)

(72) Inventors: Hiroaki Hokari, Tokyo (JP); Yasushi Sato, Tokyo (JP); Naoki Taguchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 375 days.

(21) Appl. No.: 17/590,617

(22) Filed: Feb. 1, 2022

(65) Prior Publication Data

US 2022/0154960 A1    May 19, 2022

Related U.S. Application Data

(63) Continuation of application No. PCT/JP2019/041507, filed on Oct. 23, 2019.

(51) Int. Cl.
   *F24F 11/63*       (2018.01)
   *G05D 23/19*       (2006.01)
   *F24F 110/00*      (2018.01)

(52) U.S. Cl.
   CPC .......... *F24F 11/63* (2018.01); *G05D 23/1917* (2013.01); *F24F 2110/00* (2018.01)

(58) Field of Classification Search
   CPC ........ F24F 11/63; F24F 2110/00; F24F 11/64; F24F 11/61; F24F 11/62; F24F 11/30; G05D 23/1917; G06N 20/00; G06N 3/08
   See application file for complete search history.

(56) References Cited

U.S. PATENT DOCUMENTS

2004/0083029 A1*  4/2004  Bicknell ............ G05D 23/1931
                                               700/276
2018/0195752 A1    7/2018  Sasaki et al.
(Continued)

FOREIGN PATENT DOCUMENTS

JP    2013-204985 A    10/2013
JP      2017-67427 A     4/2017
WO   WO 2017/163445 A1   9/2017

OTHER PUBLICATIONS

Clarke, J.A., Strachan, P.A. and Pernot, C., 1993. An approach to the calibration of building energy simulation models. Transactions—American Society Of Heating Refrigerating And Air Conditioning Engineers, 99, pp. 917-917 (Year: 1993).*

(Continued)

*Primary Examiner* — Alicia M. Choi
(74) *Attorney, Agent, or Firm* — Birch, Stewart, Kolasch & Birch, LLP

(57) ABSTRACT

An air-conditioning control device includes: an air-conditioning data acquisition unit to acquire air-conditioning data; a determination unit to determine whether or not the air-conditioning data is present in a sparse region; an estimation unit to, in a case where the determination unit determines that the air-conditioning data is present in the sparse region, apply extrapolation using a non-learning model for associating the air-conditioning data with a startup time of an air conditioner to a machine learning model, and estimate the startup time of the air conditioner from the air-conditioning data by using the non-learning model; and a control unit to perform control to start up the air conditioner at the startup time estimated by the estimation unit.

9 Claims, 11 Drawing Sheets

(56) References Cited

U.S. PATENT DOCUMENTS

2018/0284758 A1* 10/2018 Cella ............... G06N 3/088
2023/0281527 A1* 9/2023 Cella ............... G06V 20/17
                                                          705/7.17

OTHER PUBLICATIONS

Kaiser, E., Kutz, J.N. and Brunton, S.L., 2018. Sparse identification of nonlinear dynamics for model predictive control in the low-data limit. Proceedings of the Royal Society A, 474(2219), p. 20180335. (Year: 2018).*
International Search Report for PCT/JP2019/041507 (PCT/ISA/210) mailed on Dec. 24, 2019.
Written Opinion of the International Searching Authority for PCT/JP2019/041507 (PCT/ISA/237) mailed on Dec. 24, 2019.

* cited by examiner

AIR CONDITIONER TIMING ESTIMATION CONTROLLER USING MACHINE LEARNING MODEL

CROSS REFERENCE TO RELATED APPLICATION

This application is a Continuation of PCT International Application No. PCT/JP2019/041507, filed on Oct. 23, 2019, which is hereby expressly incorporated by reference into the present application.

TECHNICAL FIELD

The present invention relates to an air-conditioning control device, an air-conditioning system, an air-conditioning control method, and a non-transitory computer readable recording medium for estimating a startup time of an air conditioner using a machine learning model.

BACKGROUND ART

As an example of a technology of controlling an air conditioner so as to execute air conditioning comfortable for a user while suppressing power consumption, there is an air-conditioning control device disclosed in Patent Literature 1, for example. The air-conditioning control device associates room temperature history information indicating a history of a change in room temperature with operation history information of the air conditioner, predicts room temperature in a case where the air conditioner does not adjust the temperature as off-time prediction room temperature on the basis of these pieces of information, and determines a control parameter for allowing the room temperature to reach target temperature at a target time on the basis of the off-time prediction room temperature.

As for the prediction of the off-time prediction room temperature, more specifically, the air-conditioning control device disclosed in Patent Literature 1 creates an off-time room temperature prediction model, which is a machine learning model for predicting future room temperature of the room in a case where the air conditioner does not adjust the temperature, on the basis of the room temperature history information and the operation history information, and determines a startup time of the air conditioner using the off-time room temperature prediction model.

CITATION LIST

Patent Literatures

Patent Literature 1: JP 2017-67427 A

SUMMARY OF INVENTION

Technical Problem

However, the creation of the machine learning model in the air-conditioning control device disclosed in Patent Literature 1 is based on the premise that there is sufficiently stored training data, for example, data of the room temperature history information and operation history information. Then, there is a problem that the machine learning model which has performed learning in a state in which the sufficient data is not stored might predict inappropriately.

The present invention is achieved to solve the above-described problem, and an object thereof is to acquire an air-conditioning control device with improved estimation accuracy regarding a startup time of an air conditioner in a case of using a machine learning model which has performed learning in a state in which sufficient data is not stored.

Solution to Problem

An air-conditioning control device to estimate a startup time of an air conditioner on the basis of a machine learning model which has performed, by using a training data group including a dense region and a sparse region having less training data than the dense region, learning for estimating the startup time of the air conditioner from air-conditioning data which is information regarding control of the air conditioner includes: processing circuitry to acquire the air-conditioning data; to determine whether or not the air-conditioning data is present in the sparse region; in a case where it is determined that the air-conditioning data is present in the sparse region, to apply extrapolation using a non-learning model for associating the air-conditioning data with the startup time to the machine learning model, and estimate the startup time of the air conditioner from the air-conditioning data by using the non-learning model; and to perform control to start up the air conditioner at the startup time estimated.

Advantageous Effects of Invention

The air-conditioning control device according to the present invention is provided with the processing circuitry to, in a case where it is determined that the air-conditioning data is present in the sparse region, apply extrapolation using the non-learning model to the machine learning model which has performed, by using the training data group including the dense region and the sparse region having less training data than the dense region, learning for estimating the startup time of the air conditioner from the air-conditioning data which is information regarding control of the air conditioner, and estimate the startup time of the air conditioner from the air-conditioning data by using the non-learning model. As a result, it is possible to improve estimation accuracy by applying the extrapolation using the non-learning model in a region in which an amount of the training data is small to estimate the startup time of the air conditioner.

DESCRIPTION OF EMBODIMENTS

First Embodiment

Figure 1:
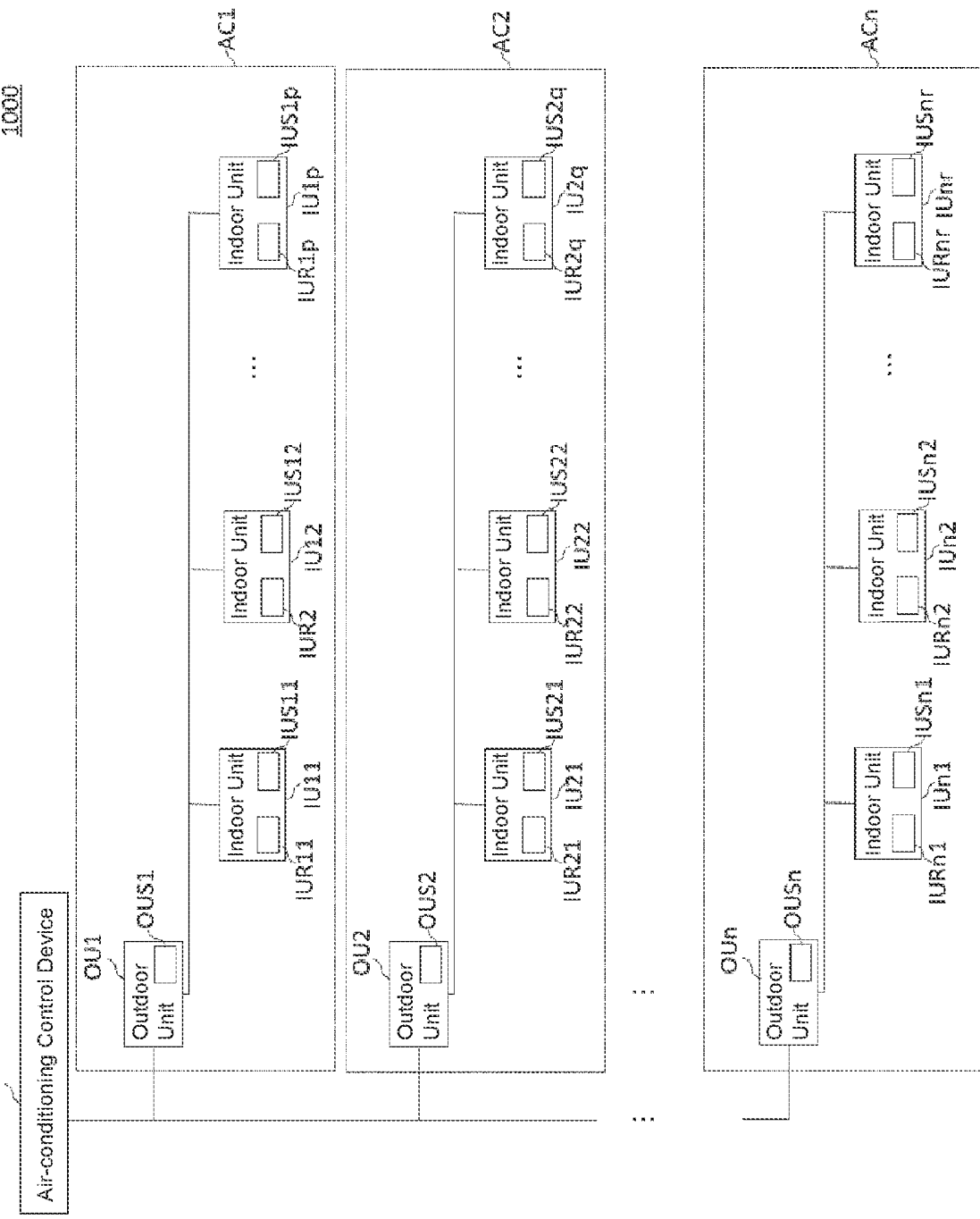
FIG. 1 is a configuration diagram illustrating a configuration of an air-conditioning system 1000 according to a first embodiment.

FIG. 1 is a configuration diagram illustrating a configuration of an air-conditioning system 1000 according to a first embodiment. The air-conditioning system 1000 is provided with an air-conditioning control device 100, a plurality of outdoor units OU (OU1, OU2, . . . OUn), and a plurality of indoor units IU (IU11, IU12, . . . IU1p, IU21, IU22, . . . IU2q, IUn1, IUn2, . . . IUnr). Herein, n, p, q, and r are any positive integers. Hereinafter, in a case where a specific outdoor unit is referred to, an additional reference sign is added after OU, and in a case where any outdoor unit or all the outdoor units are referred to, they are represented only by OU. As for the indoor unit similarly, in a case where a specific indoor unit is referred to, an additional reference sign is added after IU, and in a case where any indoor unit or all the indoor units are referred to, they are represented only by IU. The same applies to an air conditioner AC, an outdoor environment sensor OUS, an indoor environment sensor IUS, and a reception unit IUR to be described later when adding the reference sign.

A plurality of indoor units IU is connected to each outdoor unit OU; for example, the indoor units IU1 (IU11, IU12, . . . IU1p) are connected to the outdoor unit OU1. The air-conditioning control device 100 is connected to the indoor units IU and the outdoor units OU by an electromagnetic method, and it does not matter whether or not a connection method is wired or wireless. The air-conditioning control device 100 may be installed in a building in which the indoor units IU and the outdoor units OU are installed, or may be provided in a remote place and connected via a network.

Each outdoor unit OU forms the air conditioner AC (AC1, AC2, . . . ACn) that performs indoor air conditioning together with the indoor units IU connected thereto. Each outdoor unit OU is provided with the outdoor environment sensor OUS (OUS1, OUS2, . . . OUSn) that detects an outdoor environment in which the outdoor unit OU is installed and acquires outdoor environment information. Each outdoor environment sensor OUS outputs the acquired outdoor environment information to the air-conditioning control device 100 as air-conditioning data. Herein, the outdoor environment information indicates an outdoor environment, and includes, for example, outdoor temperature, outdoor humidity and the like at each time.

Each indoor unit IU is provided with the indoor environment sensor IUS (IUS11, IUS12, . . . IUS1p, IUS21, IUS22, . . . IUS2q, IUSn1, IUSn2, . . . IUSnr) that detects an indoor environment in which the indoor unit IU is installed and acquires indoor environment information. Each indoor unit IU is provided with the reception unit IUR (IUR11, IUR12, . . . IUR1p, IUR21, IUR22, . . . IUR2q, IURn1, IURn2, . . . IURnr) that receives setting information from a user. Each indoor unit IU outputs the acquired indoor environment information, the received setting information, and operation information indicating an operation state of the air conditioner AC to the air-conditioning control device 100 via the outdoor unit OU as air-conditioning data. Herein, the indoor environment information indicates an indoor environment, and includes, for example, indoor temperature, indoor humidity and the like at each time. The setting information is information set by the user via the reception unit, and includes, for example, target temperature, target humidity, and a target time at which an environment value of a room in which the indoor unit IU is installed is made to reach a target value. Herein, the environment value of the room is a value indicated by the indoor environment information, and the target value is a target value of the environment value of the room indicated by the setting information.

The operation information indicates the operation state of the air conditioner AC, and includes, for example, operation capacity of the air conditioner AC, information indicating whether the air conditioner AC is in an active state or a stopped state, information indicating in which mode the air conditioner AC is among operation modes including a cooling mode, a heating mode, and a dehumidification mode. Not only the indoor unit IU but also the outdoor unit OU may output the operation information. Herein, the operation capacity indicates strength of air-conditioning capacity of the air conditioner AC, and includes, for example, a compressor frequency of the outdoor unit OU, refrigerant evaporation temperature, refrigerant condensation temperature, the number of operating indoor units IU and the like.

In the description above, the outdoor unit OU and the indoor unit IU are provided with the outdoor environment sensor OUS and the indoor environment sensor IUS, respectively; however, the sensors may be provided independently from the outdoor unit OU and the indoor unit IU. Alternatively, the outdoor environment information may be acquired not from the outdoor environment sensor OUS but from an external server and the like.

Figure 2:
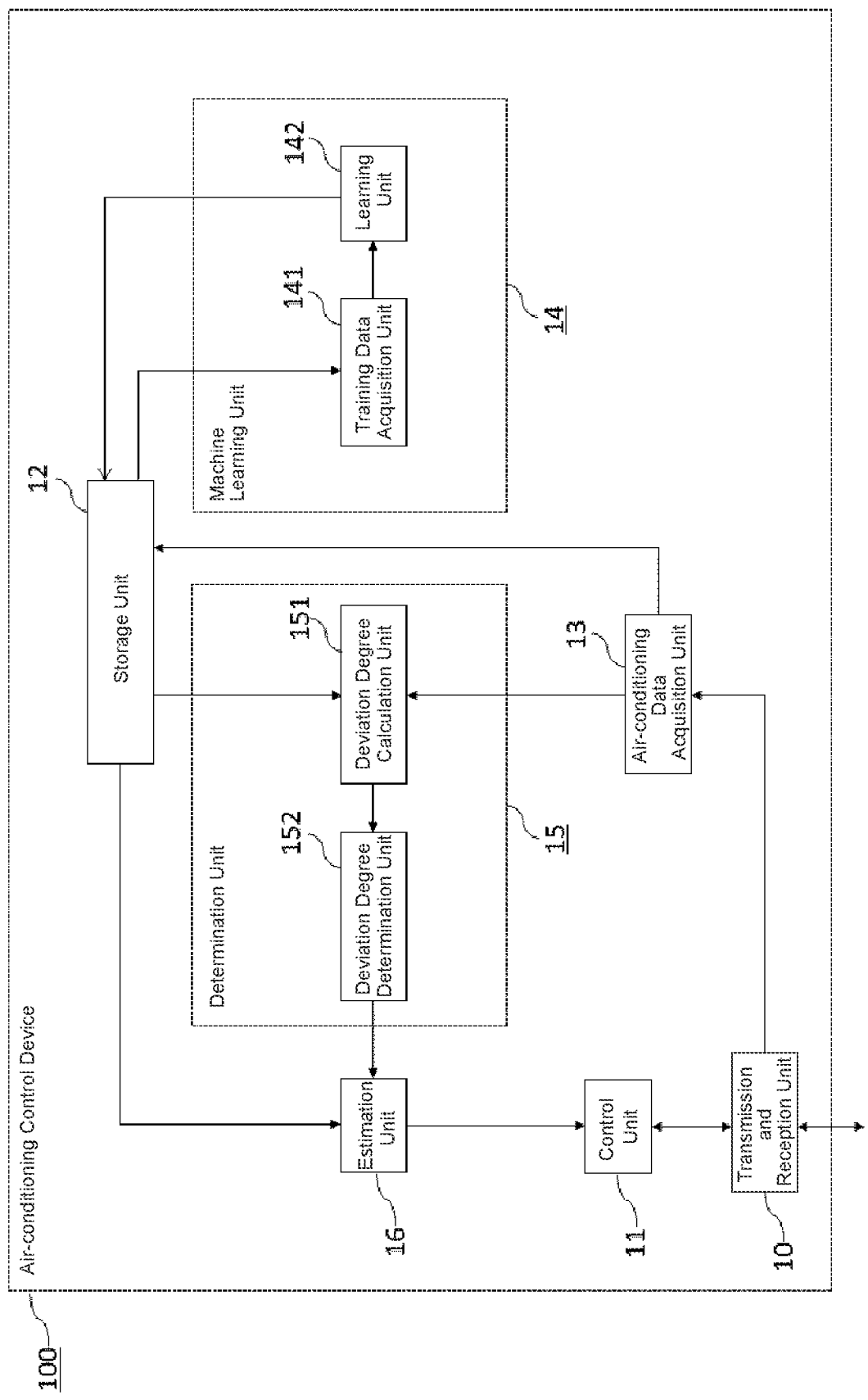
FIG. 2 is a configuration diagram illustrating a configuration of an air-conditioning control device 100 according to the first embodiment.

FIG. 2 is a configuration diagram illustrating a configuration of the air-conditioning control device 100 according to the first embodiment. The air-conditioning control device 100 estimates a startup time of the air conditioner on the basis of a machine learning model which has performed, by using a training data group including a dense region and a sparse region having less training data than the dense region, learning for estimating the startup time of the air conditioner from the air-conditioning data which is information regarding control of the air conditioner. The air-conditioning control device 100 is provided with a transmission and reception unit 10, a control unit 11, a storage unit 12, an air-conditioning data acquisition unit 13, a machine learning unit 14, a determination unit 15, and an estimation unit 16.

Herein, a region having a large amount of training data is referred to as the dense region, and a region having a small amount of training data is referred to as the sparse region. There is a sufficient amount of training data for performing the learning in the dense region, and thus the estimation unit 16 can estimate an appropriate startup time from the machine learning model which has performed the learning by using the training data.

A well-known technology may be used as a learning method of the machine learning model, and a case of supervised learning is described below as a specific example. As another specific example, for example, reinforcement learning may be used, and in this case, the reinforcement learning may be performed using, as a reward, a difference between a certain index value required for the environment value to reach the target value, such as a required time actually required, and an estimated value, power consumption, a change in temperature per unit time and the like, or an equation acquired by combining them, for example.

The transmission and reception unit 10 transmits and receives various types of information to and from external devices including the indoor unit IU and the outdoor unit OU. Especially, in the first embodiment, the transmission and reception unit 10 receives the air-conditioning data from the indoor unit and the outdoor unit, and transmits a control signal to the indoor unit and the outdoor unit.

Herein, the air-conditioning data is information regarding control of the air conditioner AC, and includes the indoor environment information, the setting information, and the operation information transmitted from the indoor unit IU, and the outdoor environment information transmitted from the outdoor unit OU in the first embodiment. The air-conditioning data input to the determination unit 15 is desirably the air-conditioning data at a current time, but may be past air-conditioning data from a previous power-off time of the air conditioner AC to the current time as long as it is possible to identify when the air-conditioning data is measured. The transmission and reception unit 10 also acquires, from the indoor unit IU, the required time actually required for the environment value to reach the target value. Data acquired by adding the required time to the air-conditioning data is referred to as the training data. The training data acquired by adding the required time to the air-conditioning data used for estimation by the estimation unit 16 is stored in the storage unit 12 and used for the learning of the machine learning model performed by the machine learning unit 14.

The control unit 11 performs centralized management of the plurality of indoor units IU and the plurality of outdoor units OU. The control unit 11 acquires the air-conditioning data from the outdoor units OU and the indoor units IU. The control unit 11 aggregates the air-conditioning data acquired from the plurality of outdoor units OU and the plurality of indoor units IU, and transmits the aggregated air-conditioning data to the machine learning unit 14 and the determination unit 15. In the first embodiment, the control unit 11 controls the air conditioner AC on the basis of an estimation result of the estimation unit 16 described later. More specifically, the control unit 11 performs control to start up the air conditioner AC at the startup time estimated by the estimation unit 16.

The storage unit 12 stores various types of information, and in the first embodiment, this stores the machine learning model the learning of which is performed by the machine learning unit 14 to be described later, the training data for performing the learning of the machine learning model and the like.

The air-conditioning data acquisition unit 13 acquires the air-conditioning data from the air conditioner AC via the transmission and reception unit 10. In the first embodiment, the air-conditioning data acquisition unit 13 acquires the air-conditioning data at the current time and transmits the acquired air-conditioning data to a deviation degree calculation unit 151 as the air-conditioning data to be used for estimating the startup time. After the control unit 11 controls the air conditioner AC on the basis of the estimation result of the estimation unit 16, the air-conditioning data acquisition unit 13 adds the required time required for the environment value to reach the target value to the air-conditioning data used for estimation by the estimation unit 16, and transmits the resultant data to the storage unit 12 as the training data for the machine learning unit 14 to perform the learning of the machine learning model.

The machine learning unit 14 performs the learning of the machine learning model for estimating the startup time of the air conditioner from the air-conditioning data, and is provided with a training data acquisition unit 141 and a learning unit 142. In the first embodiment, a difference in temperature between the indoor temperature and the target temperature, a difference in temperature between the indoor temperature and the outdoor temperature, and the operation capacity of the air conditioner are input to the machine learning model the learning of which is performed by the machine learning unit 14, and the machine learning model outputs a required time required until the indoor temperature of the room reaches the target temperature at the target time after the air conditioner AC is started up.

The machine learning model used by the learning unit 142 may be any model as long as this can express a nonlinear function, but in the first embodiment, a neural network is used.

The input to the machine learning model is not limited to the above, and the indoor temperature, the target temperature, and the outdoor temperature may be directly input without taking the difference, or the indoor humidity, the outdoor humidity, and the number of outdoor units OU and indoor units IU may be input. Similarly, the output from the machine learning model is not limited to the above, and a required time required for another environment value such as, for example, the indoor humidity to reach the target value may be output, or a required time required for a plurality of environment values to reach the target values may be output.

The machine learning model may directly output the startup time using the target time and the current time as inputs. In the first embodiment, the estimation unit 16 to be described later acquires the required time until the environment value reaches the target value using the learned machine learning model, and estimates the startup time of the air conditioner AC from the required time and the target time. However, since the startup time of the air conditioner AC is calculated from the required time and the target time as described above, it can be said, in a state in which the target time is set, that the estimation unit 16 estimates the startup time in both cases: a case where the machine learning model directly outputs the startup time, and a case where the machine learning model outputs the required time and the startup time is calculated by performing post-processing.

The training data acquisition unit 141 acquires the training data for performing the learning of the machine learning model and the machine learning model from the storage unit 12. The training data acquisition unit 141 performs pre-processing of converting the acquired training data into a format suitable for input to the machine learning model. In the first embodiment, since the input to the machine learning model is the difference in temperature between the indoor temperature and the target temperature, the difference in temperature between the indoor temperature and the outdoor temperature, and the operation capacity of the air conditioner, the training data acquisition unit 141 calculates the difference in temperature between the indoor temperature indicated by the indoor environment information included in the air-conditioning data and the target temperature indicated by the setting information, and similarly calculates the difference in temperature between the indoor temperature and the outdoor temperature indicated by the outdoor environment information. Herein, since the operation capacity of the air conditioner is included in the operation information, the pre-processing as described above is not necessary. Hereinafter, data after the pre-processing is also referred to as the training data.

The learning unit 142 performs the learning of the machine learning model using the training data acquired by the training data acquisition unit 141. The learning may be performed using an existing learning method such as an error back propagation method. Herein, the learning of the machine learning model includes not only initial learning but also relearning. The learning unit 142 transmits the learned machine learning model to the storage unit 12 and stores the learned machine learning model in the storage unit 12.

The determination unit 15 determines whether or not the air-conditioning data acquired by the air-conditioning data acquisition unit 13 is present in the sparse region. The determination unit 15 determines whether or not the air-conditioning data is present in the sparse region on the basis of a criterion set in advance, and is provided with the deviation degree calculation unit 151 and a deviation degree determination unit 152 in the first embodiment.

The fact that the air-conditioning data is present in the sparse region includes not only a case where the air-conditioning data is an outlier with respect to the training data, but also a case where the air-conditioning data is present in the vicinity of the training data but the number thereof is small.

In the first embodiment, the storage unit 12 stores, as the training data, data acquired by adding an actual required time to the air-conditioning data received from the air conditioner AC, and the machine learning unit 14 updates the machine learning model using the training data added to the storage unit 12. Therefore, the sparse region of the training data is not static one that does not change after being initially determined, but dynamically changes as the training data increases. In the first embodiment, addition and updating of the training data are performed every day. However, in a case where the training data is already sufficient and thus the updating is not required so frequently, it is sufficient to update every several days or every week.

The deviation degree calculation unit 151 calculates a deviation degree of the air-conditioning data with respect to the training data. Herein, the deviation degree of the air-conditioning data with respect to the training data indicates a degree of deviation between the air-conditioning data and the air-conditioning data included in the training data, and is an amount serving as an index indicating whether or not an appropriate estimation result can be acquired in a case where the air-conditioning data is input to the machine learning model which has performed learning by using the training data. The degree of deviation between the air-conditioning data and the training data is represented by a parameter space defined by parameters included in the air-conditioning data. Herein, the parameters included in the air-conditioning data are the parameters of various types of information included in the air-conditioning data, and includes, for example, the indoor temperature indicated by the indoor environment information, the outdoor temperature indicated by the outdoor environment information and the like. Specific examples of the deviation degree include a distance between the air-conditioning data and the training data in the parameter space, a value indicating in which region the air-conditioning data is present when the training data is classified into a plurality of regions on the basis of the number of pieces of data, a value indicating how much training data is present around the air-conditioning data and the like. Herein, the distance between the air-conditioning data and the training data includes not only a distance between the air-conditioning data and each data included in the training data, but also a distance between the air-conditioning data and the dense region in which a large amount of training data gathers, a distance between the air-conditioning data and a mode value of a probability density function when the training data is approximated by the probability density function and the like.

The deviation degree determination unit 152 determines whether or not the air-conditioning data is present in the sparse region on the basis of the deviation degree calculated by the deviation degree calculation unit 151. More specifically, the deviation degree determination unit 152 determines whether or not the deviation degree is equal to or larger than a predetermined threshold, and determines that the air-conditioning data is present in the sparse region in a case where the deviation degree is equal to or larger than the predetermined threshold.

Specific examples of a method by which the deviation degree calculation unit 151 calculates the deviation degree and a method by which the deviation degree determination unit 152 determines whether or not the air-conditioning data is present in the sparse region are hereinafter described.

Figure 3:
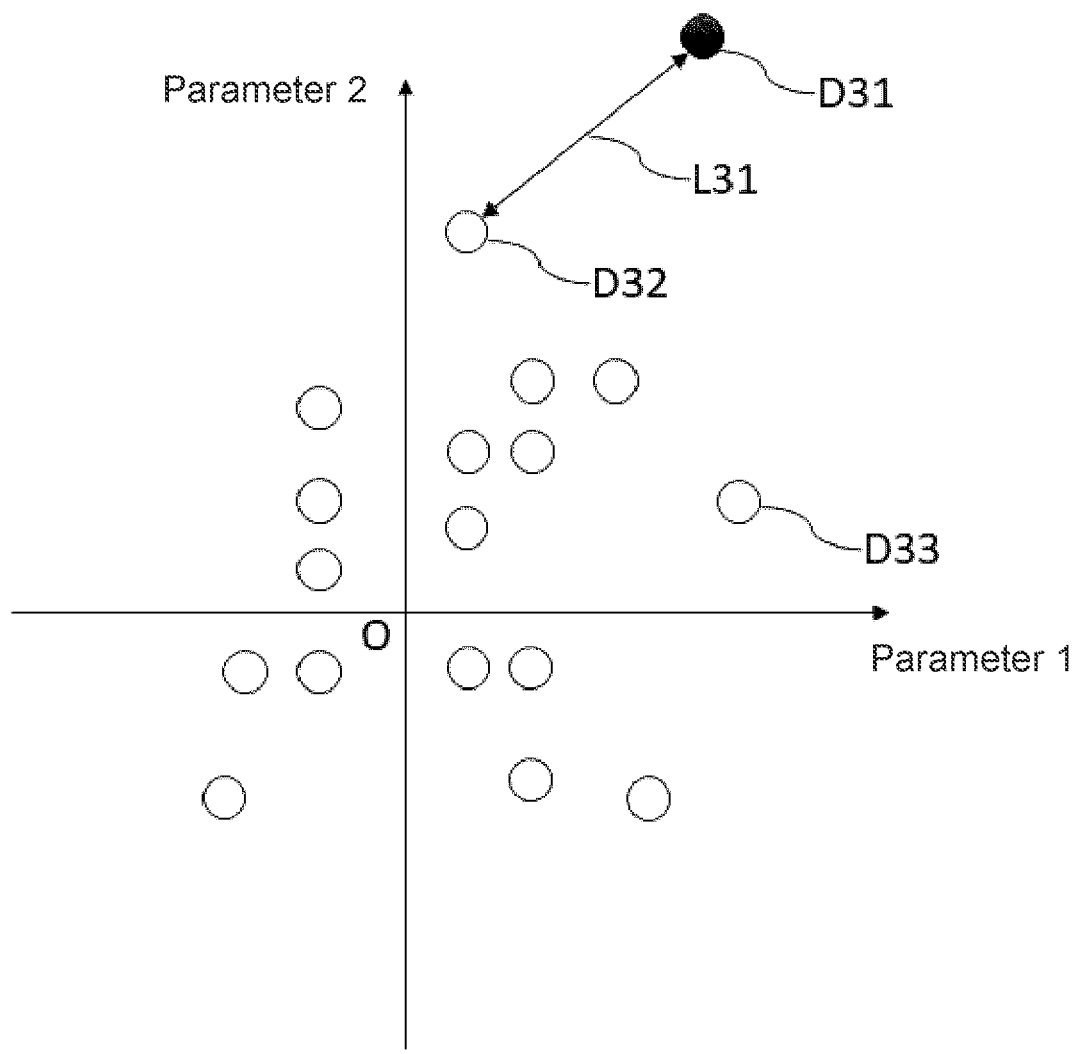
FIG. 3 is an explanatory diagram illustrating a specific example of a method by which a deviation degree calculation unit 151 calculates a deviation degree and a method by which a deviation degree determination unit 152 determines whether or not air-conditioning data is present in a sparse region.

A first method is a method of calculating, as the deviation degree, a distance between air-conditioning data for estimating the startup time and a point which is included in the training data and which is the nearest point with respect to the air-conditioning data. This method is described with reference to FIG. 3. FIG. 3 is an explanatory diagram illustrating a specific example of a method by which the deviation degree calculation unit 151 calculates the deviation degree and a method by which the deviation degree determination unit 152 determines whether or not the air-conditioning data is present in the sparse region.

In FIG. 3, a point indicated by a black circle represents air-conditioning data D31 at the current time, and points indicated by white circles represent the training data. The points indicated by the white circles are, to be precise, data acquired by projecting the training data to the same parameter space as that of the air-conditioning data, that is, a space acquired by removing the required time, but herein, the data acquired by projecting the training data is also referred to as the training data.

Each of the horizontal axis and the vertical axis represents a parameter included in the air-conditioning data, and represents, for example, the indoor temperature, the outdoor temperature or the like. The parameters included in the air-conditioning data are higher-dimensional in general, but are represented two-dimensionally in FIG. 3 for the sake of explanation. The deviation degree calculation unit 151 calculates a distance between the air-conditioning data D31 and each training data. Herein, a point closest to the air-conditioning data D31 out of the training data is training data D32, and the deviation degree calculation unit 151 calculates a distance L31 between the air-conditioning data D31 and the training data D32 as the deviation degree.

The deviation degree determination unit 152 determines whether or not the deviation degree calculated by the deviation degree calculation unit 151, that is, the distance L31 between the air-conditioning data D31 and the training data D32 is equal to or larger than a predetermined first threshold T1, and determines that the air-conditioning data D31 is present in the sparse region in a case where it is equal to or larger than the first threshold T1. Herein, the first threshold T1 is a real number of zero or larger.

Figure 4:
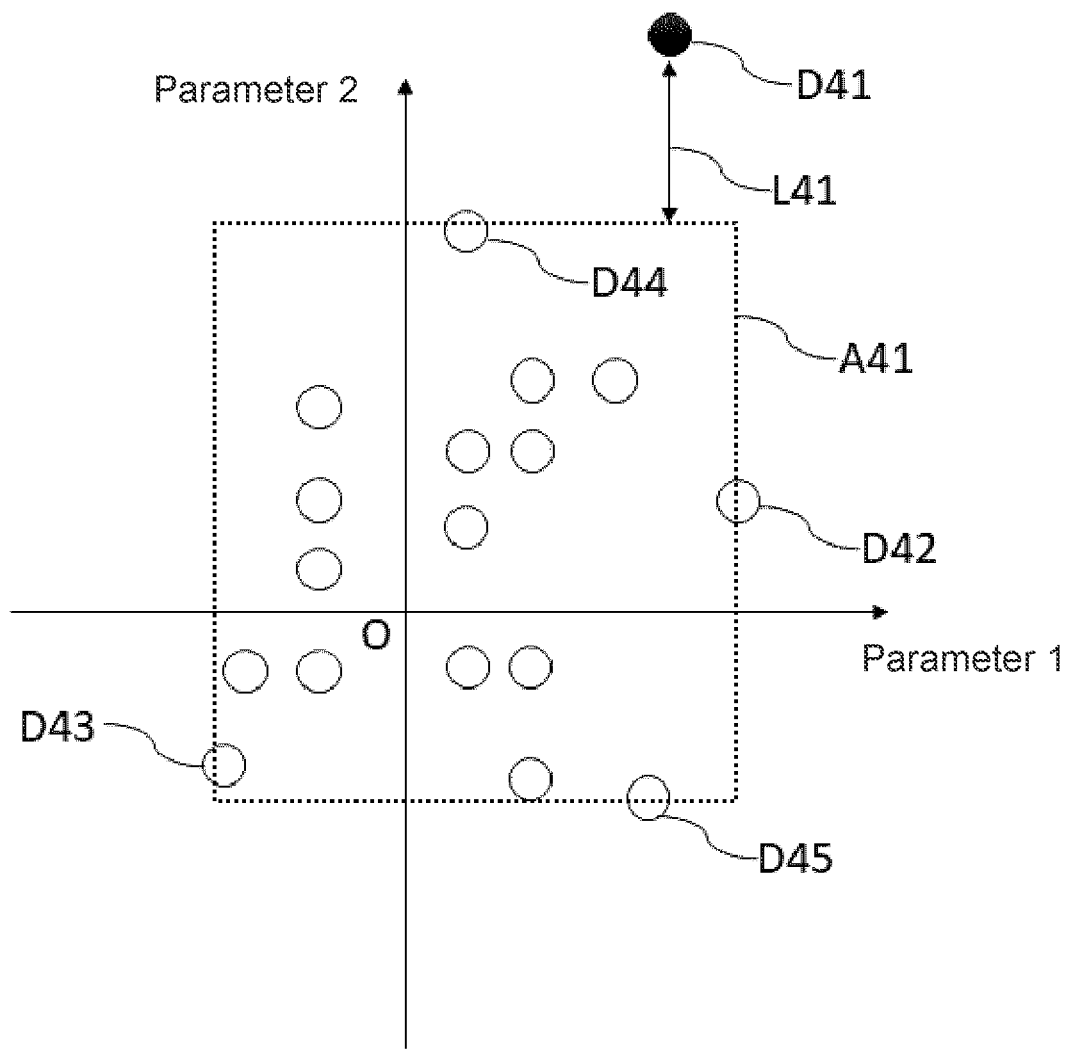
FIG. 4 is an explanatory diagram illustrating a specific example of a method by which the deviation degree calculation unit 151 calculates a deviation degree and a method by which the deviation degree determination unit 152 determines whether or not air-conditioning data is present in the sparse region.

A second method is a method of setting the dense region of the training data and calculating the distance between the air-conditioning data and the dense region; this method is described with reference to FIG. 4. FIG. 4 is an explanatory diagram illustrating a specific example of a method by which the deviation degree calculation unit 151 calculates the deviation degree and a method by which the deviation degree determination unit 152 determines whether or not the air-conditioning data is present in the sparse region.

The deviation degree calculation unit 151 sets a dense region A41, which is a region in which a large number of pieces of training data are present. Herein, as a method of setting the dense region A41, for example, a rectangular region having an appropriate size is set, the number of pieces of training data present inside the rectangular region is counted, and a ratio of the training data included in the rectangular region is calculated. Then, processing of expanding the rectangular region when the ratio of the training data included in the rectangular region is smaller than a predetermined ratio, and narrowing the rectangular region when this is equal to or larger than the predetermined ratio is repeated. In this processing, in a case where the rectangular region is expanded in previous processing and the rectangular region is narrowed in current processing, the rectangular region after the previous processing may be set as the dense region A41. The same applies to a case where the rectangular region is narrowed in the previous processing and the rectangular region is expanded in the current processing.

Alternatively, in a case where it is desired to determine whether or not the air-conditioning data is an outlier, a maximum value and a minimum value of the parameter of each data included in the training data may be detected, and the region formed by the maximum value and the minimum value may be set as the dense region A41. In FIG. 4, the latter method is adopted, and a maximum value of a parameter 1 is set by training data D42, a minimum value of the parameter 1 is set by training data D43, a maximum value of a parameter 2 is set by training data D44, and a minimum value of the parameter 2 is set by training data D45. In FIG. 4, the deviation degree calculation unit 151 calculates a distance L41 between air-conditioning data D41 and the dense region A41 as the deviation degree.

The deviation degree determination unit 152 determines whether or not the deviation degree calculated by the deviation degree calculation unit 151, that is, the distance L41 between the air-conditioning data D41 and the dense region A41 is equal to or larger than a predetermined second threshold T2, and determines that the air-conditioning data D41 is present in the sparse region in a case where it is equal to or larger than the second threshold T2. The second threshold T2 is a real number of zero or larger.

Figure 5:
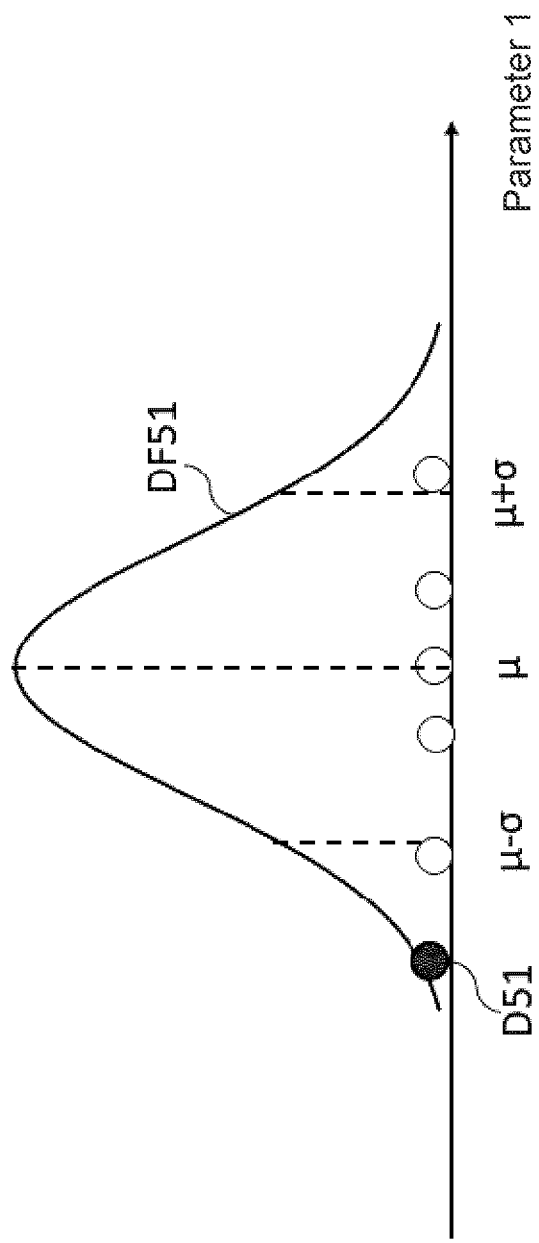
FIG. 5 is an explanatory diagram illustrating a specific example of a method by which the deviation degree calculation unit 151 calculates a deviation degree and a method by which the deviation degree determination unit 152 determines whether or not air-conditioning data is present in the sparse region.

A third method is a method of approximating the training data by a probability density function, and calculating the deviation degree on the basis of the probability density function. This method is described with reference to FIG. 5. FIG. 5 is an explanatory diagram illustrating a specific example of a method by which the deviation degree calculation unit 151 calculates the deviation degree and a method by which the deviation degree determination unit 152 determines whether or not the air-conditioning data is present in the sparse region.

As illustrated in FIG. 5, the deviation degree calculation unit 151 approximates appearance frequency of the training data with normal distribution DF51, and calculates a distance from a mode value of the normal distribution DF51 as the deviation degree. Herein, the mode value of the normal distribution DF51 is set to $\mu$.

The deviation degree determination unit 152 determines whether or not the deviation degree calculated by the deviation degree calculation unit 151 is equal to or larger than a predetermined third threshold T3, and determines that air-conditioning data D51 is present in the sparse region in a case where it is equal to or larger than the third threshold T3. The third threshold T3 is a real number of zero or larger, and is represented by $\sigma$ in FIG. 5.

FIG. 5 illustrates a case where the parameter is one-dimensional, but the same applies to a case where the parameters are two or higher-dimensional.

Figure 6:
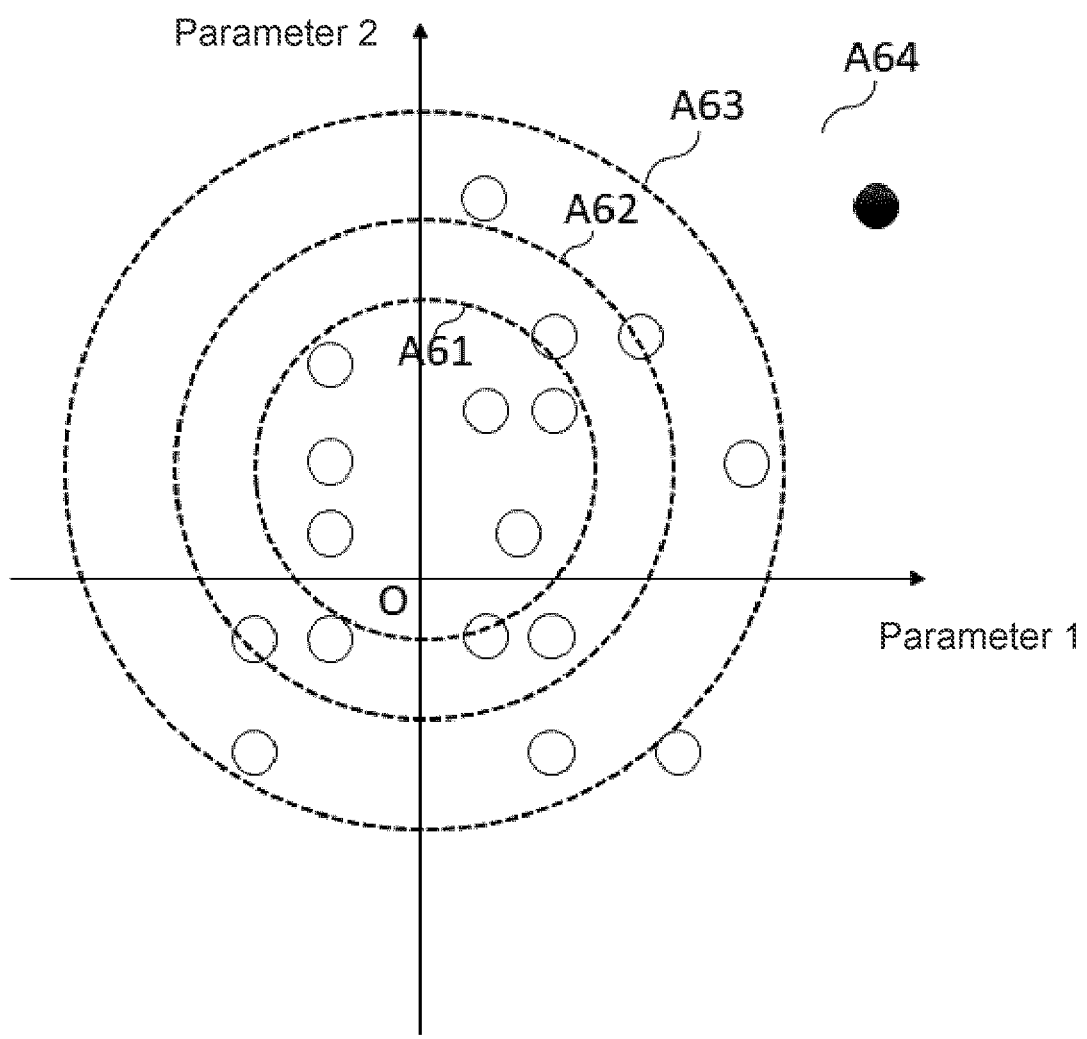
FIG. 6 is an explanatory diagram illustrating a specific example of a method by which the deviation degree calculation unit 151 calculates a deviation degree and a method by which the deviation degree determination unit 152 determines whether or not air-conditioning data is present in the sparse region.

Instead of simply calculating the distance from the mode value as the deviation degree, it is also possible to classify the parameter space into several regions on the basis of the probability density function, and calculate the region of presence as the deviation degree. This method is described with reference to FIG. 6.

First, the deviation degree calculation unit 151 approximates the training data with a probability density function. Herein also, the probability density function adopts normal distribution. Then, for example, a 50% region A61, a 75% region A62, a 95% region A63, and a 95% region outside A64 are set on the basis of the probability density function. Herein, the 50% region A61 is a region inside which 50% of the training data is present, and the same applies to the 75% region A62 and the 95% region A63. The 95% region outside A64 is the region outside the 95% region A63, and this region is set as the sparse region. On the basis of a position of the air-conditioning data, for example, the deviation degree calculation unit 151 calculates 50, 75, 95, and 100 as the deviation degree when the air-conditioning data is present in the 50% region A61, the 75% region A62, the 95% region A63, and the 95% region outside A64, respectively. The deviation degree determination unit 152 can determine whether or not the air-conditioning data is present in the sparse region by setting a value equal to or larger than 96 and smaller than 100 as a predetermined threshold.

Figure 7:
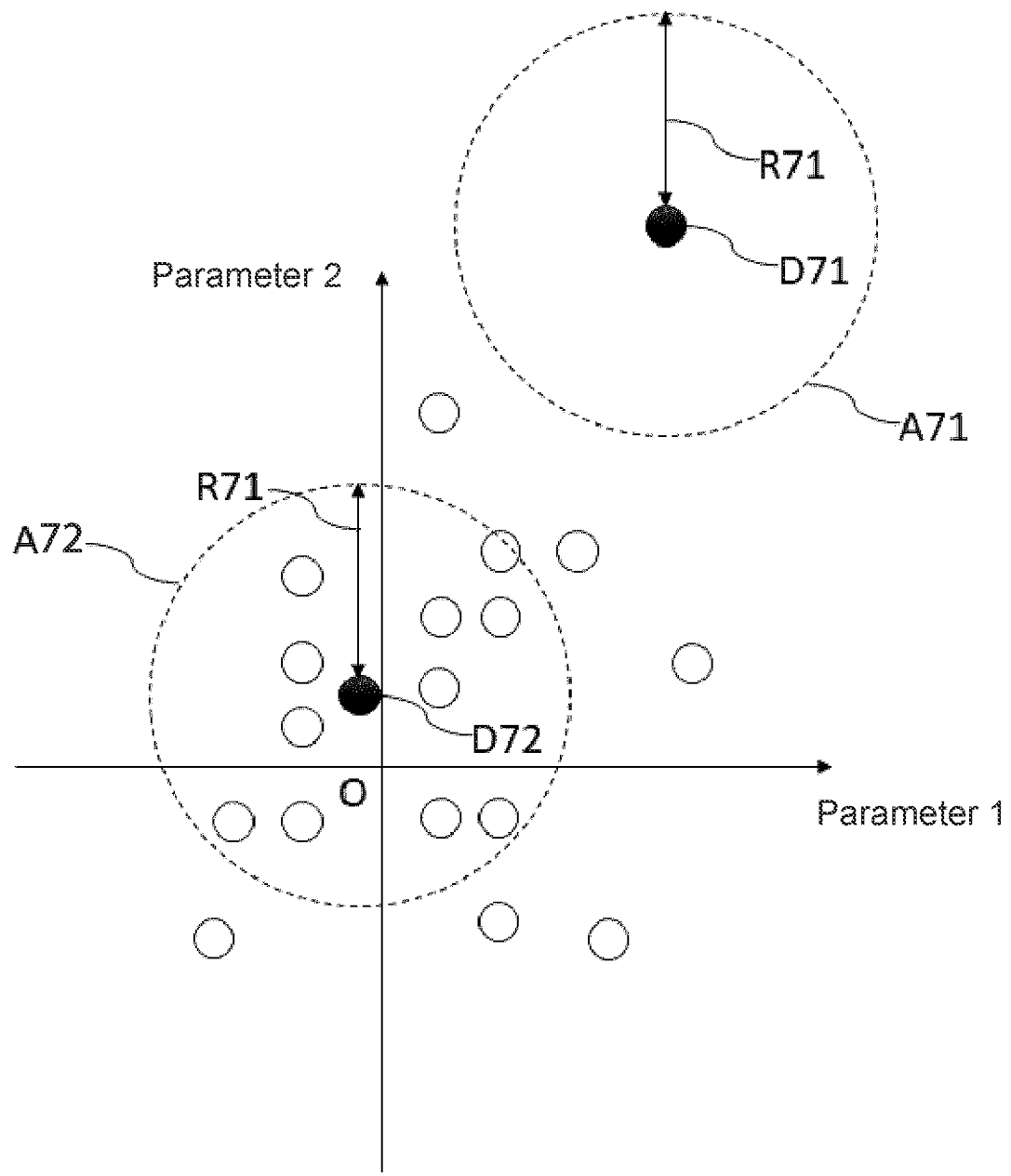
FIG. 7 is an explanatory diagram illustrating a specific example of a method by which the deviation degree calculation unit 151 calculates a deviation degree and a method by which the deviation degree determination unit 152 determines whether or not air-conditioning data is present in the sparse region.

A fourth method is a method of calculating a value indicating how much training data is present around the air-conditioning data as the deviation degree. This method is described with reference to FIG. 7. FIG. 7 is an explanatory diagram illustrating a specific example of a method by which the deviation degree calculation unit 151 calculates the deviation degree and a method by which the deviation degree determination unit 152 determines whether or not the air-conditioning data is present in the sparse region.

The deviation degree calculation unit 151 sets a region A71 around air-conditioning data D71. In FIG. 7, the region A71 is a disk set as a region having a radius R71 or smaller centered at the air-conditioning data D71. Herein, a value of the radius R71 is set in advance by a designer of the air-conditioning control device 100 or a user of the air conditioner AC. The deviation degree calculation unit 151 first counts the number of pieces of training data present inside the region A71, and calculates the number of pieces of training data or a ratio of the number of pieces of training data present inside the region A71. Since the smaller the value calculated above, the higher the possibility of the presence in the sparse region, a value acquired by adding a negative sign to the value calculated above or by taking reciprocal of the value calculated above is calculated as the deviation degree. By performing this operation, in the fourth method also, the value calculated as the deviation degree can be treated as a value with a higher possibility of being present in the sparse region as the value is larger. The deviation degree determination unit 152 determines whether or not the deviation degree calculated by the deviation degree calculation unit 151 is equal to or larger than a predetermined fourth threshold T4, and determines that the air-conditioning data D71 is present in the sparse region in a case where it is equal to or larger than the fourth threshold T4. For example, in FIG. 7, since no training data is present in the region A71 set around the air-conditioning data D71, it is determined that the air-conditioning data D71 is present in the sparse region, and since a large number of pieces of training data are present in a region A72 set around air-conditioning data D72, it is determined that the air-conditioning data D72 is not present in the sparse region or is present in the dense region. Herein, the region A72 is a disk set as a region having a radius R71 or smaller centered at the air-conditioning data D72.

In the above-described four methods, the deviation degree is calculated depending on the position of the air-conditioning data in the parameter space; however, position coordinates of the air-conditioning data in the parameter space, that is, the parameters themselves may be directly used as the deviation degree. In this case, the deviation degree determination unit 152 can determine whether or not the air-conditioning data is present in the sparse region by setting the sparse region in advance and determining whether or not each parameter of the air-conditioning data is included in a range of the sparse region. For example, in a case where the dense region is set as a rectangular region and the sparse region is set as a region outside the dense region, it is sufficient to independently determine whether or not each parameter is equal to or larger than a predetermined threshold. The sparse region set by the deviation degree determination unit 152 does not need to be fixed after being initially set, and may be dynamically set as the training data increases.

The position coordinates used in the above-described method do not need to be the parameters themselves included in the air-conditioning data, and coordinate components after performing appropriate coordinate conversion may also be used.

The estimation unit 16 estimates the startup time of the air conditioner from the air-conditioning data acquired by the air-conditioning data acquisition unit 13 using the learned machine learning model the learning of which is performed by the machine learning unit 14. In the first embodiment, the machine learning model outputs the required time required for the environment value to reach the target value. Therefore, the estimation unit 16 estimates the startup time of the air conditioner AC by calculating a time which is earlier than the target time by the required time.

In a case where the determination unit 15 determines that the air-conditioning data is present in the sparse region, the estimation unit 16 applies extrapolation using a non-learning model to the machine learning model which has performed, using the training data, learning for estimating the startup time of the air conditioner from the air-conditioning data, and the estimation unit 16 estimates the startup time of the air conditioner from the air-conditioning data using the non-learning model.

Herein, the extrapolation using the non-learning model includes not only expressing, when the dense region is represented by one section, a relationship between the air-conditioning data and the startup time in a region outside the section by the non-learning model, but also expressing, when the dense region is present discretely as a plurality of sections, a relationship between the air-conditioning data and the startup time in a region between the plurality of sections by the non-learning model.

In the first embodiment, the estimation unit 16 applies the extrapolation to the machine learning model using a linear model as the non-learning model. Herein, the extrapolation is applied using the linear model; however, in a case where the relationship between the air-conditioning data and the required time in a certain region is known empirically or from a generally known relational expression, the extrapolation may be applied using a model other than the linear model.

As is the case with the training data acquisition unit 141, the estimation unit 16 performs pre-processing for converting the acquired air-conditioning data into a format suitable for input to the machine learning model. In the first embodiment, since the input to the machine learning model includes the difference in temperature between the indoor temperature and the target temperature, the difference in temperature between the indoor temperature and the outdoor temperature, and the operation capacity of the air conditioner, the estimation unit 16 calculates the difference in temperature between the indoor temperature indicated by the indoor environment information included in the air-conditioning data and the target temperature indicated by the setting information, and the difference in temperature between the indoor temperature and the outdoor temperature indicated by the outdoor environment information. Herein, since the operation capacity of the air conditioner is included in the operation information, the pre-processing as described above is not necessary. As is the case with the training data, the air-conditioning data after the pre-processing is also referred to as the air-conditioning data.

Figure 8:
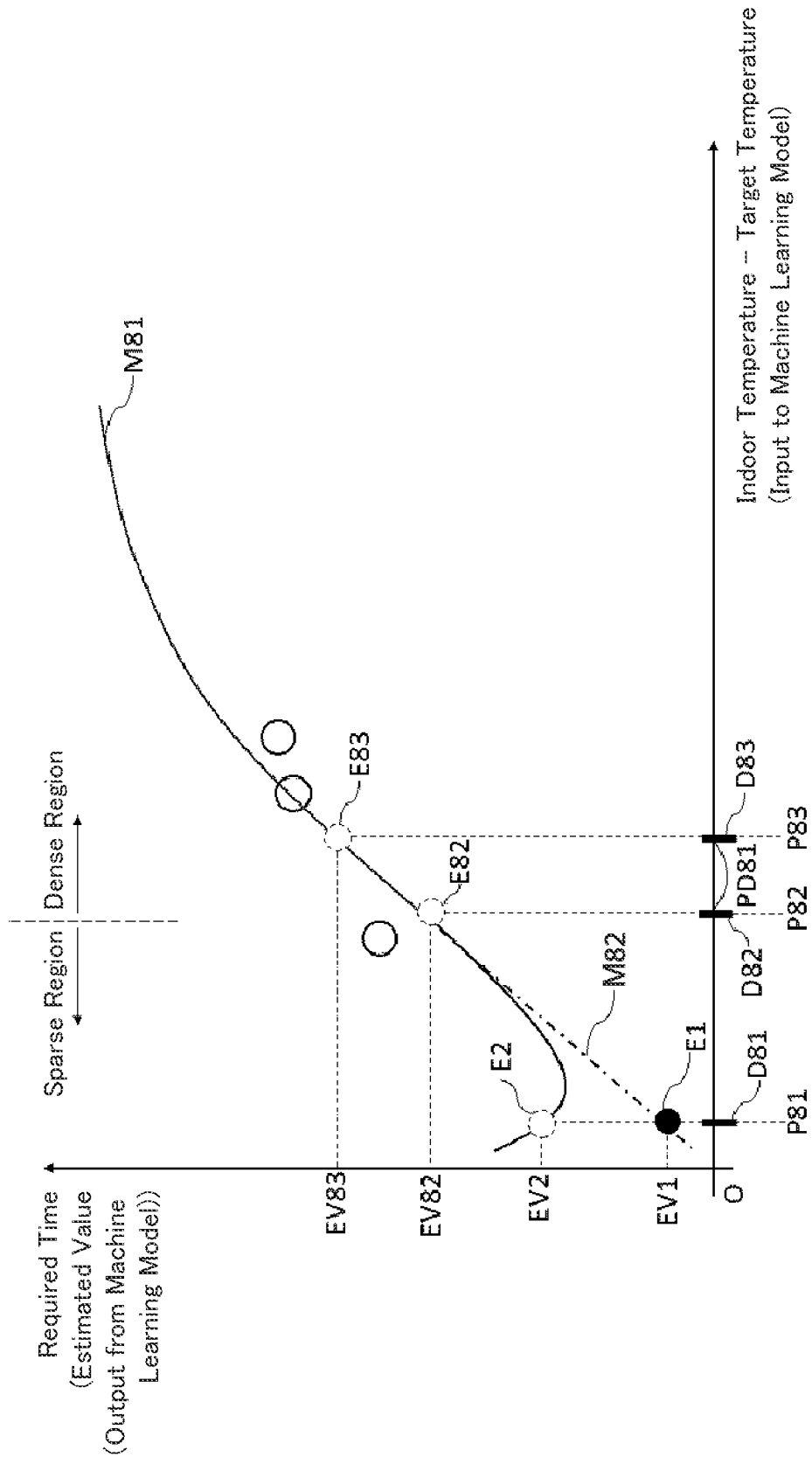
FIG. 8 is an explanatory diagram illustrating a specific example of a method by which an estimation unit 16 applies extrapolation using a non-learning model to a learned machine learning model and estimates a startup time of an air conditioner from the air-conditioning data using the non-learning model.

A specific example of a method by which the estimation unit 16 applies the extrapolation using the non-learning model to the machine learning model is described with reference to FIG. 8. FIG. 8 is an explanatory diagram illustrating a specific example of a method by which the estimation unit 16 applies the extrapolation using the non-learning model to the learned machine learning model and estimates the startup time of the air conditioner from the air-conditioning data using the non-learning model.

A machine learning model M81 is indicated by a solid line in FIG. 8, and is represented by a nonlinear function. In FIG. 8, the difference in temperature between the indoor temperature and the target temperature is represented by the horizontal axis, and the time required for the indoor temperature to reach the target temperature is represented by the vertical axis; in general, an input parameter to the machine learning model M81 is represented by the horizontal axis, and an estimated value by the machine learning model M81 is represented by the vertical axis. Although FIG. 8 is illustrated two-dimensionally for the sake of explanation, the input parameters and the output parameters are higher-dimensional in general. For example, in the first embodiment, the input to the machine learning model includes three of the difference in temperature between the indoor temperature and the target temperature, the difference in temperature between the indoor temperature and the outdoor temperature, and the operation capacity of the air conditioner AC, so that the input parameters are three-dimensional, and the output is the time required for the indoor temperature to reach the target temperature, so that the output parameter is one-dimensional.

Herein, data acquired by adding an estimated value to the input air-conditioning data is referred to as estimated data. In FIG. 8, solid squares on the horizontal axis represent the air-conditioning data, solid white circles represent the training data, dotted white circles represent the estimated data including the estimated value acquired using the machine learning model M81, and black circles represent the estimated data including the estimated value acquired using a non-learning model M82 from the input air-conditioning data.

In FIG. 8, a region in which the difference in temperature between the indoor temperature and the target temperature is P82 or larger is set as the dense region, and a region in which the difference in temperature is smaller than P82 is set as the sparse region.

In a case where the determination unit 15 determines that the air-conditioning data is present in the dense region, the estimated value corresponding to the parameter value of the air-conditioning data is simply calculated from the machine learning model M81. Hereinafter, a case where the determination unit 15 determines that the air-conditioning data is present in the sparse region is described.

First, the estimation unit 16 selects two points of the air-conditioning data present in the dense region. Herein, selecting the air-conditioning data present in the dense region means selecting an appropriate parameter in the region of the parameter space set as the dense region, and includes not only selecting two points of the air-conditioning data included in the training data stored in the storage unit 12 but also selecting an appropriate parameter in the dense region and generating the air-conditioning data including the selected parameter in a pseudo manner. The parameter space herein corresponds to the input parameter to the machine learning model and is generally different from the parameter space of the air-conditioning data in the determination unit 15, but the input parameter to the machine learning model is generated from the parameter of the air-conditioning data, and thus even in a case of the parameter space of the machine learning model, the sparse region and the dense region may be set as in a case of the air-conditioning data.

Herein, any two points may be selected, but they are desirably present near a boundary of the sparse region. In FIG. 8, one point present at the boundary between the dense region and the sparse region (air-conditioning data D82) is selected. The other point is desirably selected near the air-conditioning data D82, and in FIG. 8, air-conditioning data D83 indicating a value P83 larger than a temperature difference P82 indicated by the air-conditioning data D82 by a predetermined value PD81 is selected.

Next, the estimation unit 16 generates estimated data corresponding to the selected two points of air-conditioning data using the machine learning model M81. In FIG. 8, when the machine learning model M81 is used, an estimated value EV82 is acquired from the air-conditioning data D82, and estimated data E82 is generated. In addition, an estimated value EV83 is acquired from the air-conditioning data D83, and estimated data E83 is generated.

Then, the estimation unit 16 generates a straight line passing through the generated estimated data E82 and estimated data E83 as the non-learning model M82. In FIG. 8, the non-learning model M82 is indicated by a dashed-dotted line.

Finally, the estimation unit 16 estimates an estimated value EV1 of air-conditioning data D81, which has been input and is an estimation target. Herein, estimated data E1 acquired by adding the estimated value EV1 to the air-conditioning data D81 may also be stored in the storage unit 12.

In the description above, the estimation unit 16 generates the estimated data, but this may be configured to perform only an operation of calculating the estimated value corresponding to the air-conditioning data from the machine learning model or the non-learning model and not to generate the estimated data.

In FIG. 8, the non-learning model M82 is represented by a straight line, but in general, the non-learning model is a hyperplane. In the description above, the two points of the air-conditioning data are selected in order to generate the non-learning model M82, but in a higher-dimensional case, it is necessary to select more pieces of air-conditioning data, specifically, more than the dimension of the hyperplane by one.

In the description above, the non-learning model M82 is generated using the two points on the machine learning model M81, but the method of generating the non-learning model is not limited thereto; for example, a plurality of pieces of training data present near the boundary with the sparse region may be selected in the dense region, and the hyperplane acquired by regression analysis from these pieces of training data may be set as the non-learning model.

A difference between a case where the extrapolation using the non-learning model is applied and a case where the extrapolation is not applied is described. For example, as illustrated in FIG. 8, in the sparse region, there is a possibility that due to inappropriate learning resulting from a small amount of training data, the machine learning model that increases after decreasing is generated though it should increase monotonically as the parameter becomes larger. In such a case, in a case where the extrapolation using the non-learning model is not applied, the estimated value acquired from the air-conditioning data D81 is an estimated value EV2 (acquired estimated data is estimated data E2), and thus a value larger than an estimated value which should be expected is estimated. However, in the air-conditioning control device 100 according to the first embodiment, since the non-learning model is generated in the sparse region on the basis of the machine learning model in the dense region, that is, the training data in the dense region, and the non-learning model is set for extrapolation by connecting the non-learning model to the machine learning model in the dense region, it is possible to estimate a more appropriate value, the estimated value EV1 in FIG. 8, which is a smaller value than that in a case of not applying the extrapolation.

Figure 9:
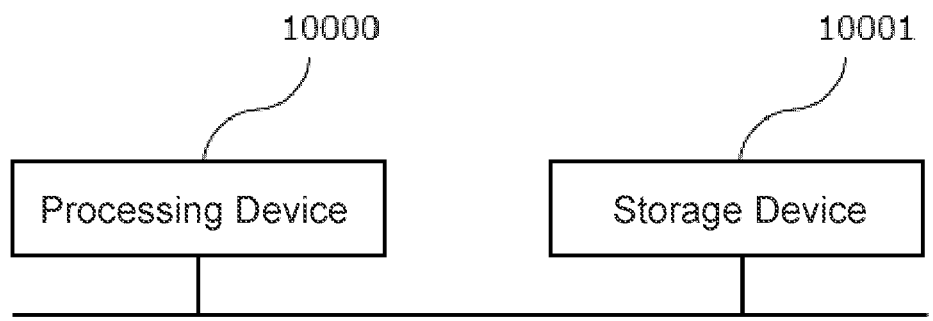
FIG. 9 is a configuration diagram illustrating an example of a hardware configuration of a computer that implements the air-conditioning control device 100.

Next, a hardware configuration of the air-conditioning control device 100 according to the first embodiment is described. Each function of the air-conditioning control device 100 is implemented by a computer. FIG. 9 is a configuration diagram illustrating an example of a hardware configuration of the computer that implements the air-conditioning control device 100.

The hardware illustrated in FIG. 9 is provided with a processing device 10000 such as a central processing unit (CPU) and a storage device 10001 such as a read only memory (ROM) or a hard disk.

The transmission and reception unit 10, the control unit 11, the air-conditioning data acquisition unit 13, the machine learning unit 14, the determination unit 15, and the estimation unit 16 illustrated in FIG. 2 are implemented by execution of a program stored in the storage device 10001 by the processing device 10000, and the storage unit 12 is implemented by the storage device 10001. Herein, the configuration described above is not limited to the configuration implemented by a single processing device 10000 and a single storage device 10001, and may be a configuration implemented by a plurality of processing devices 10000 and a plurality of storage devices 10001.

A method for implementing each function of the air-conditioning control device 100 is not limited to a combination of the hardware and the program described above; this may be implemented by hardware alone such as a large scale integrated circuit (LSI) acquired by implementing the program in the processing device, or some of the functions may be implemented by dedicated hardware and the others may be implemented by a combination of the processing device and the program.

The air-conditioning control device 100 is configured as described above.

Next, the operation of the air-conditioning control device 100 is described separately for a learning operation and an estimation operation. Herein, the operation of the air-conditioning control device 100 is an air-conditioning control method, and the air-conditioning control method corresponding to the learning operation is referred to as a learning method, and the method corresponding to the estimation operation is referred to as an estimation method. A program that causes the computer to execute the air-conditioning control method is an air-conditioning control program.

Figure 10:
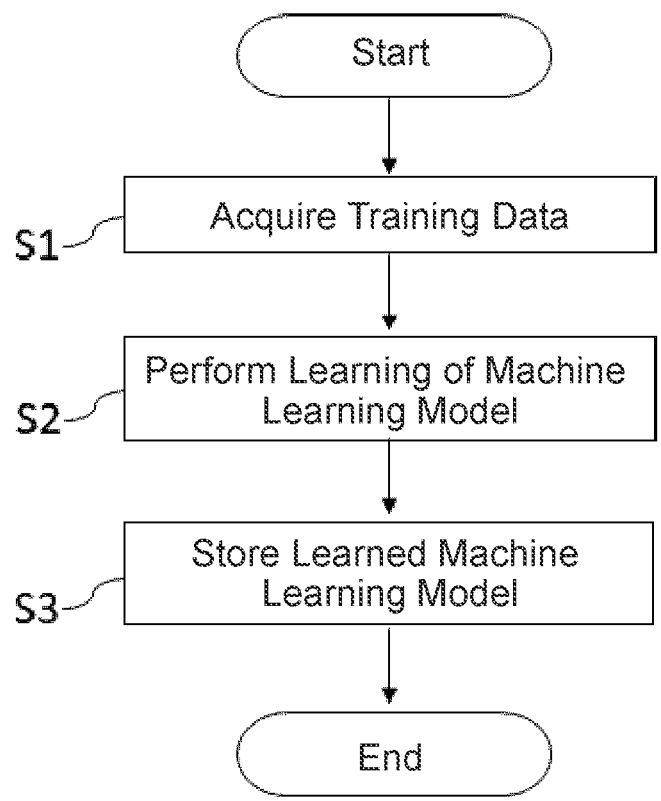
FIG. 10 is a flowchart illustrating an operation of performing learning of the machine learning model by the air-conditioning control device 100.

First, the learning operation of the air-conditioning control device 100 is described with reference to FIG. 10. FIG. 10 is a flowchart illustrating an operation of performing the learning of the machine learning model by the air-conditioning control device 100.

First, at step S1, the training data acquisition unit 141 acquires the training data and the machine learning model from the storage unit 12. The training data acquisition unit 141 transmits the acquired training data and machine learning model to the learning unit 142. Herein, in a case of the initial learning, all the training data is acquired, and in a case of the relearning, it is sufficient to acquire only the added training data.

The training data acquisition unit 141 performs preprocessing of converting the acquired training data into a format suitable for input to the machine learning model. In the first embodiment, since the input to the machine learning model is the difference in temperature between the indoor temperature and the target temperature, the difference in temperature between the indoor temperature and the outdoor temperature, and the operation capacity of the air conditioner, the training data acquisition unit 141 calculates the difference in temperature between the indoor temperature indicated by the indoor environment information included in the air-conditioning data and the target temperature indicated by the setting information, and similarly calculates the difference in temperature between the indoor temperature and the outdoor temperature indicated by the outdoor environment information.

Next, at step S2, the learning unit 142 performs the learning of the machine learning model using the received training data. In the first embodiment, the machine learning model is a neural network, and the learning can be performed using the existing learning method such as the error back propagation method.

Finally, at step S3, the learning unit 142 stores the learned machine learning model in the storage unit 12.

The air-conditioning control device 100 finishes the learning operation after performing the above-described steps.

Next, the estimation operation of the air-conditioning control device 100 is described with reference to FIG. 11.

Figure 11:
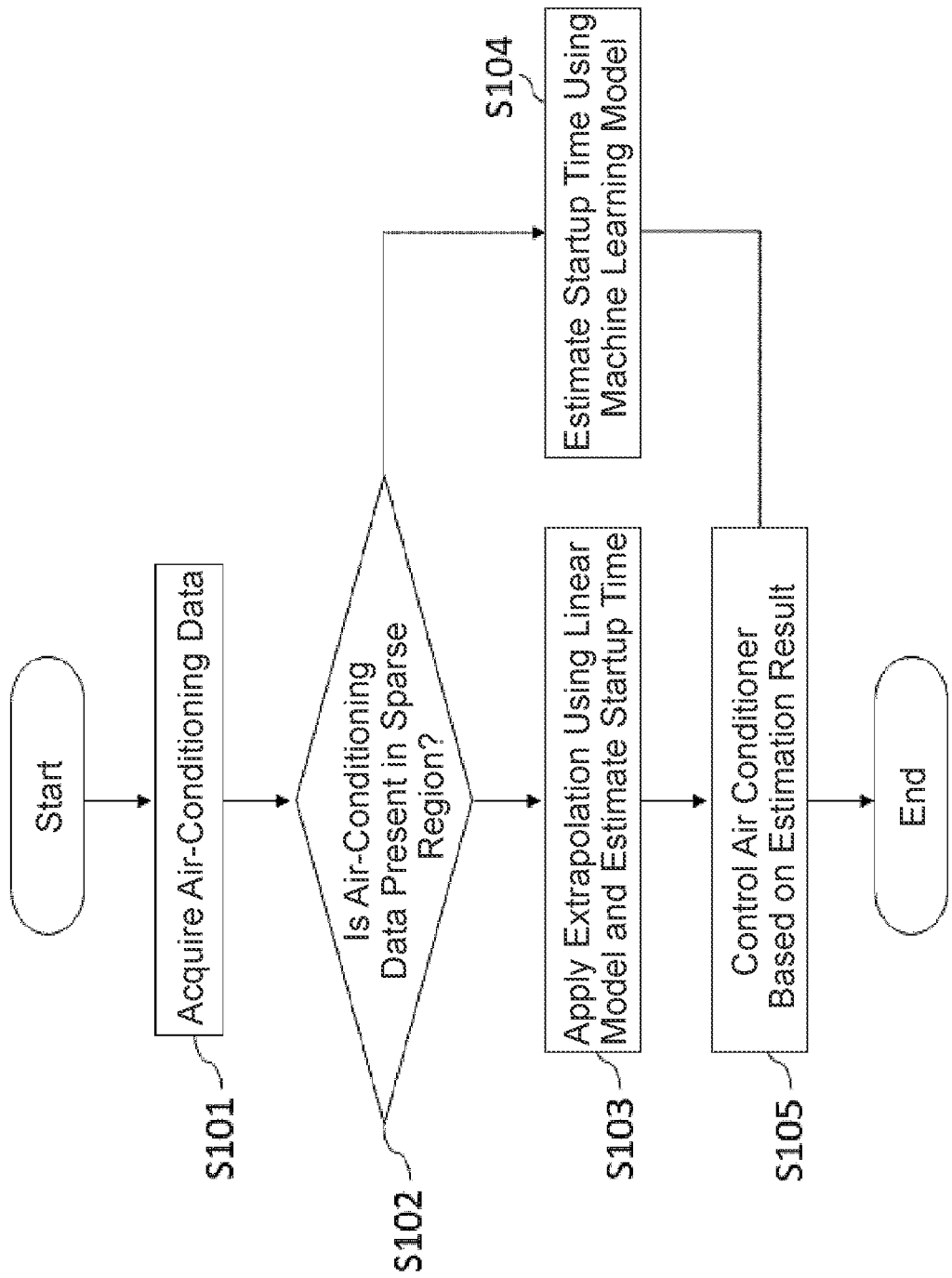
FIG. 11 is a flowchart illustrating an operation of estimating the startup time of the air conditioner AC by the air-conditioning control device 100.

FIG. 11 is a flowchart illustrating an operation of estimating the startup time of the air conditioner AC by the air-conditioning control device 100.

First, in an air-conditioning data acquisition process at step S101, the air-conditioning data acquisition unit 13 acquires the air-conditioning data from the air conditioner AC via the transmission and reception unit 10. More specifically, the air-conditioning data acquisition unit 13 acquires the outdoor environment information from the outdoor unit OU, and acquires the indoor environment information, the setting information, and the operation information from the indoor unit IU.

Next, in a determination process at step S102, the determination unit 15 determines whether or not the air-conditioning data acquired at step S101 is present in the sparse region.

More specifically, first, the deviation degree calculation unit 151 calculates the deviation degree of the air-conditioning data. Herein, it is assumed that the distance between the air-conditioning data and the training data is calculated as the deviation degree by the first method described above.

Then, the deviation degree determination unit 152 determines whether or not the deviation degree is equal to or larger than a predetermined threshold, and determines that the air-conditioning data is present in the sparse region when determining that it is equal to or larger than the predetermined threshold.

In the determination process at step S102, in a case where it is determined that the air-conditioning data is present in the sparse region, the operation of the air-conditioning control device 100 proceeds to step S103, and in a case where it is determined that the air-conditioning data is not present in the sparse region, the operation of the air-conditioning control device 100 proceeds to step S104.

Following step S103 and step S104 are collectively referred to as an estimation process.

At step S103, the estimation unit 16 estimates the startup time of the air conditioner. Since step S103 is a case where the air-conditioning data is determined to be present in the sparse region, the extrapolation using the non-learning model is applied to the machine learning model, and the startup time is estimated using the extrapolation model.

Also at step S104, the estimation unit 16 estimates the startup time of the air conditioner, but step S104 is a case where the air-conditioning data is determined not to be present in the sparse region, so that the extrapolation using the non-learning model is not applied, and the startup time is estimated directly using the machine learning model.

Next, in a control process at step S105, the control unit 11 transmits a control signal so that the air conditioner AC starts up at the startup time estimated by the estimation unit 16. The control signal is transmitted to the air conditioner AC via the transmission and reception unit, and when receiving the control signal, the air conditioner AC is set to start up at the startup time.

Finally, in a training data storage process at step S105, the transmission and reception unit 10 acquires the required time actually required for the indoor temperature to reach the target temperature from the indoor unit IU, and stores, as training data, the required time together with the air-conditioning data acquired at step S101 in the storage unit 12.

Thanks to the estimation operation of the air-conditioning control device 100 as described above, even when the input air-conditioning data is a value deviated from the training data, the startup time can be estimated more appropriately by applying the non-learning model for extrapolation to the learned machine learning model as compared with a case of using the machine learning model as it is without extrapolation.

That is, the air-conditioning control device 100 according to the first embodiment can reduce the possibility of inappropriate estimation by applying the extrapolation using the non-learning model in the region in which the amount of the training data is small and estimating the startup time of the air conditioner.

Variations on the air-conditioning control device 100 in the first embodiment are described below.

In the description above, the control unit 11 is implemented by the same hardware as that of the other components provided in the air-conditioning control device 100, but the control unit 11 may be implemented by hardware (processing device and storage device) different from that of the other components. Herein, in the configuration in which the control unit 11 is implemented by the different hardware, the control unit 11 may be provided in each of the indoor units IU and the outdoor units OU to control the corresponding indoor unit IU or outdoor unit OU, or may perform centralized management of the indoor units IU and the outdoor units OU as in a case where the control unit 11 is implemented by the same hardware.

In addition to the control unit 11, also the air-conditioning control device 100 may be provided not only outside the indoor units IU and the outdoor units OU as illustrated in FIG. 1 but also inside the indoor unit IU and the outdoor unit OU.

In the description above, the air-conditioning control device 100 is connected to the plurality of outdoor units OU and is connected to the indoor units IU via the outdoor units OU; however, the air-conditioning control device 100 may be directly connected to the indoor units IU and the outdoor units OU, or the air-conditioning control device 100 may be connected to the indoor units IU and be connected to the outdoor units OU via the indoor units IU. Although the plurality of outdoor units OU and the plurality of indoor units IU are provided, there may be only a single outdoor unit OU and a single indoor unit IU.

The estimation unit 16 and the training data acquisition unit 141 are configured to perform the pre-processing for converting the air-conditioning data into a format suitable for input to the machine learning model, but the determination unit 15 may perform the above-described pre-processing in place of the estimation unit 16.

Alternatively, instead of performing the pre-processing by the estimation unit 16 and the training data acquisition unit 141, the air-conditioning data acquisition unit 13 may perform the pre-processing and thereby store, in the storage unit 12, the data subjected to the pre-processing as for not only the air-conditioning data used for estimation but also the training data.

In these cases, the determination unit 15 may determine whether or not the air-conditioning data is present in the sparse region on the basis of the air-conditioning data after the pre-processing. That is, the determination unit 15 may determine whether or not the air-conditioning data is present in the sparse region in the parameter space formed not by the parameters included in the air-conditioning data but by the input parameters of the machine learning model.

In the first embodiment, it is assumed that a training data group used for the learning of the machine learning model of the air-conditioning control device 100 includes the dense region and the sparse region. However, when the number of pieces of data of the entire training data group is not sufficient and thus the dense region and the sparse region cannot be clearly distinguished from each other at an initial stage of the learning, it is considered that the effect cannot be sufficiently exerted. Therefore, the determination unit 15 may count the number of pieces of training data included in the training data group before calculating the deviation degree of the air-conditioning data, and in a case where the number of pieces of training data is equal to or larger than a predetermined fifth threshold, the determination unit 15 may determine whether or not the air-conditioning data is present in the sparse region and the estimation unit 16 may apply extrapolation using the non-learning model. By doing so, it is possible to concentrate on accumulating the training data when the number of pieces of data of the entire training data group is small, and apply the extrapolation using the non-learning model from a time point when the training data is sufficiently accumulated.

The determination unit 15 determines whether or not the air-conditioning data is present in the sparse region, but the determination unit 15 may not only determine whether or not the air-conditioning data is present in the sparse region but also determine which parameter indicates a value deviated from the training data, that is, an abnormal value. For example, it can be implemented by comparing the parameters of the air-conditioning data and the training data or comparing the parameters of the air-conditioning data and the sparse region set in advance.

For example, in FIG. 3, the parameter 1 of the air-conditioning data D31 is equal to or smaller than the parameter 1 of training data D33 and thus is not an abnormal value, whereas the parameter 2 of the air-conditioning data is a value larger than that of any other training data and thus deviates from the training data. The deviation degree determination unit 152 can determine the parameter that is an abnormal value by comparing the parameters of the air-conditioning data and the training data.

The determination of the parameter may be additionally performed in a case where it is determined that the air-conditioning data is present in the sparse region, or may be performed simultaneously with the determination of the sparse region. For example, in a case where an abnormal parameter is found, it may be determined that the parameter is abnormal and the air-conditioning data is present in the sparse region.

The air-conditioning control device 100 according to the first embodiment estimates the startup time by applying the extrapolation to the machine learning model in a case where the air-conditioning data is present in the sparse region, but a case is assumed where it is not possible to reach the target temperature at the target time due to disturbance and the like even if the startup is performed at the estimated startup time. Furthermore, in a case such as after a long vacation in a company, a school and the like, a time at which the indoor temperature reaches the target temperature might be later than usual due to an influence of heat inside a wall and the like. With respect to the problem described above, it is considered that the user of the air conditioner AC feels more comfortable when it reaches the target temperature at a time slightly earlier than the target time as compared with a case where it reaches the target temperature at a time later than the target time. Thus, the estimation unit 16 may perform correction for estimating an earlier startup time on the estimated value acquired by the machine learning model or the estimated value acquired by the non-learning model.

For example, by performing correction to add a safety factor to the estimated value, the estimation unit 16 estimates so that the estimated startup time of the air conditioner AC is earlier than that in a case where the safety factor is not added. More specifically, by calculating a longer required time as the estimated value by adding the safety factor to the estimated value of the required time, or by calculating a longer required time as the estimated value by multiplying the estimated value of the required time by a value larger than one, it is possible to estimate a time earlier than that in a case where the correction is not performed as the startup time. As a result of this, it is possible to control the air conditioner to reach the target temperature at an earlier time than that in a case where the correction is not performed.

Second Embodiment

In the first embodiment, to the machine learning model, the difference in temperature between the indoor temperature and the target temperature, the difference in temperature between the indoor temperature and the outdoor temperature, and the operation capacity of the air conditioner are input. An air-conditioning control device 100 according to a second embodiment further uses a capacity saving value of an air conditioner AC as an input to a machine learning model. Herein, it is assumed that the capacity saving value is included in operation information. Capacity saving is to suppress maximum power and power consumption by suppressing the operation capacity of the air conditioner, and may be achieved by, for example, lowering a compressor frequency or lowering a rotation speed of a fan. The capacity saving value is an index of the capacity saving, and in the second embodiment, a ratio of an actual operation capacity to the maximum operation capacity of the air conditioner AC is used as the capacity saving value. In the second embodiment, it is assumed that the capacity saving value can be set to 60%, 80%, and 100%. Herein, 60% indicates a state in which the air conditioner AC is operated at 60% capacity, 80% indicates a state in which the air conditioner AC is operated at 80% capacity, and 100% indicates a state in which the air conditioner AC is operated at 100% capacity.

In the second embodiment, the ratio of the actual operation capacity to the maximum operation capacity of the air conditioner AC is used as the capacity saving value, but the compressor frequency or the rotation speed of the fan may be directly used as the capacity saving value.

Hereinafter, a difference from the first embodiment is described.

An air-conditioning data acquisition unit 13 acquires operation information including the capacity saving value of the air conditioner AC by adding the capacity saving value to acquired air-conditioning data. More specifically, data acquired by adding information indicating that the capacity saving value is 60% to the acquired air-conditioning data, data acquired by adding information indicating that the capacity saving value is 80% to the acquired air-conditioning data, and data acquired by adding information indicating that the capacity saving value is 100% to the acquired air-conditioning data are generated. Herein, data acquired by adding information regarding the capacity saving value to the air-conditioning data is also referred to as the air-conditioning data. The air-conditioning data acquisition unit 13 transmits the generated pieces of air-conditioning data to a determination unit 15.

A machine learning unit 14 performs learning of the machine learning model as is the case with the first embodiment. Herein, as described above, the capacity saving value is one of input parameters to the machine learning model according to the second embodiment. The training data at that time is acquired by adding air-conditioning data including the capacity saving value selected by an estimation unit 16 to be described later and a required time actually required to reach the target temperature.

The determination unit 15 determines whether or not the data acquired by adding the capacity saving value to the acquired air-conditioning data is present in a sparse region. As a method of determining whether or not the air-conditioning data is present in the sparse region, the method described in the first embodiment may be used as it is, but a method that can be used in a case where the parameter is discrete as the capacity saving value in the second embodiment is described with reference to FIG. 12.

Figure 12:
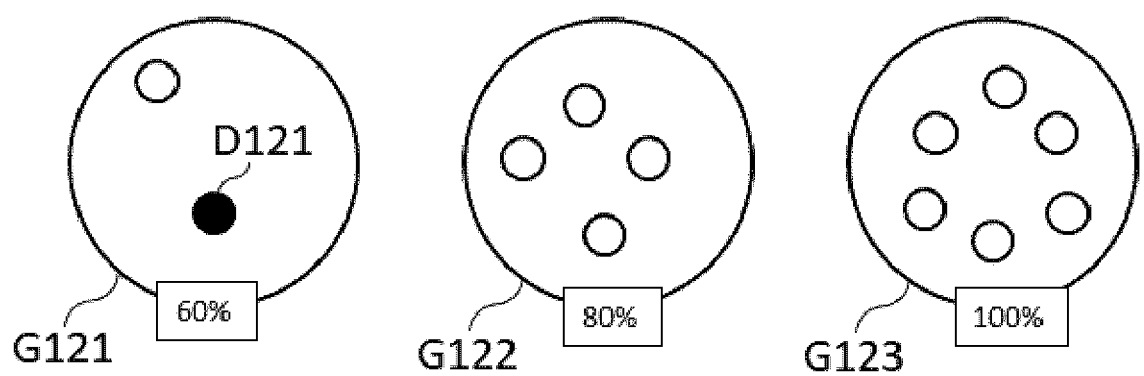
FIG. 12 is an explanatory diagram illustrating a specific example of a method by which a deviation degree calculation unit 151 calculates a deviation degree and a method by which a deviation degree determination unit 152 determines whether or not air-conditioning data is present in a sparse region.

FIG. 12 is an explanatory diagram illustrating a specific example of a method by which a deviation degree calculation unit 151 calculates a deviation degree and a method by which a deviation degree determination unit 152 determines whether or not the air-conditioning data is present in the sparse region.

In FIG. 12, air-conditioning data D121 is indicated by a black circle, and training data is indicated by a white circle.

In the second embodiment, since the capacity saving value is a discrete value, groups can be formed by the respective values of the capacity saving value. The deviation degree calculation unit 151 counts the number of pieces of the training data included in the group to which the input air-conditioning data belongs, and calculates a value acquired by adding a negative sign to the count value as the deviation degree. In FIG. 12, the air-conditioning data D121 belongs to a group G121 having the capacity saving value of 60% and there is one piece of training data in the group, so that the deviation degree is calculated as −1. Herein, the deviation degree calculation unit 151 calculates the value acquired by adding a negative sign to the count value of the number of pieces of data as the deviation degree, but the deviation degree calculation unit 151 may calculate a value acquired not by adding a negative sign but by taking reciprocal as the deviation degree.

The deviation degree determination unit 152 determines whether or not the calculated deviation degree is equal to or larger than a predetermined sixth threshold, and determines that the air-conditioning data is present in the sparse region in a case where it is equal to or larger than the sixth threshold. In FIG. 12, for example, in a case where the sixth threshold is set to −3, it is determined that the air-conditioning data D121 is present in the sparse region. In a case where it is determined, in the above-described determination, that it is not present in the sparse region, it is determined whether or not another parameter is present in the sparse region using the method described in the first embodiment.

The estimation unit 16 inputs each piece of air-conditioning data to which the capacity saving value is added to the learned machine learning model, and thereby estimates a startup time. That is, the estimation unit 16 acquires the startup times when the capacity saving values are 60%, 80%, and 100%.

The estimation unit 16 selects the capacity saving value at which the air conditioner AC is started up, that is, selects the startup time which corresponds to the capacity saving value and at which the air conditioner AC is started up. Herein, in a case where the capacity saving value at the time of operation of the air conditioner AC is set in advance by the user, it is sufficient that the estimation unit 16 simply selects starting up at the startup time corresponding to the set capacity saving value. Alternatively, in a case where the startup time corresponding to the set capacity saving value is a time before the current time, it is possible to select the capacity saving value to which a startup time after the current time corresponds and which is the largest.

As another method of determining the capacity saving value and the startup time corresponding to the capacity saving value, it is possible to determine the capacity saving value and the startup time at which the air conditioner AC is started up on the basis of a combination of the capacity saving value and the corresponding startup time.

For example, it is possible to hold in advance a table, a function and the like of an index value such as power consumption per unit time corresponding to the capacity saving value, and select a combination of the capacity saving value and the startup time so that the product of the index value and the startup time of the selected combination is minimum and the startup time of the selected combination is later than the current time.

It is possible to estimate the startup time even after a lapse of a certain period of time after the startup, control to increase the capacity saving value when the startup time estimated from the current capacity saving value is earlier than the current time, and control to decrease the capacity saving value when the startup time estimated from the current capacity saving value is later than the current time on the contrary. By performing the above-described control, for example, it is possible to prevent occurrence of non-heating (room is not heated up) due to the operation of the air conditioner AC in a state in which the capacity saving value is lowered in the wintertime. The estimation after a lapse of a certain period of time may be performed not only once but also a plurality of times.

A method similar to that of the first embodiment may be used for extrapolation using a non-learning model by the estimation unit 16, but an extrapolation method that can be used in a case where the parameter is discrete such as the capacity saving value is described below.

In a case where the parameter is discrete, the method of selecting two points of the air-conditioning data in the dense region as in the first embodiment is not performed; a value acquired by simply multiplying a ratio between the parameter of the input air-conditioning data and the parameter of the air-conditioning data in the dense region by an estimated value acquired from the machine learning model by replacing the discrete parameter with the parameter of the dense region may be used as an estimated value acquired by the extrapolation using the non-learning model. For example, in a case of FIG. 12, when a group G123 having the capacity saving value of 100% is used as the dense region, the parameter of the air-conditioning data D121 is 60%, and the parameter of the air-conditioning data belonging to the dense region is 100%. Thus, a value acquired by multiplying 100(%)/60(%) by the estimated value acquired by inputting the air-conditioning data D121 whose capacity saving value is replaced with 100% to the machine learning model may be used as the estimated value acquired by the extrapolation using the non-learning model.

Herein, as a relationship between the capacity saving value and the required time, the larger the capacity saving value, the shorter the required time, so that "the capacity saving value of the air-conditioning data belonging to the dense region/the capacity saving value of the input air-conditioning data" is multiplied; however, it is necessary to determine which one of the air-conditioning data belonging to the dense region and the input air-conditioning data is to be set as a denominator or a numerator depending on a proportional relationship between each parameter and the estimated value.

After estimating the startup time, the estimation unit 16 notifies a control unit 11 of an estimation result and the selected air-conditioning data, and the control unit 11 performs control to operate the air conditioner AC with the selected capacity saving value at the notified startup time.

The estimation unit 16 notifies the air-conditioning data acquisition unit 13 of the selected air-conditioning data, and the air-conditioning data acquisition unit 13 stores the selected air-conditioning data and the actual time required to reach the target temperature together in a storage unit 12 as the training data.

The air-conditioning control device 100 according to the second embodiment is configured as described above, and this can reduce power consumption by controlling the operation of the air conditioner AC with an appropriate capacity saving value.

The variations on the air-conditioning control device 100 according to the first embodiment are also applicable to the air-conditioning control device 100 according to the second embodiment.

INDUSTRIAL APPLICABILITY

The air-conditioning control device according to the present invention is suitable for use in an air-conditioning system that manages air conditioning so as to reach target temperature at a target time.

REFERENCE SIGNS LIST

100: air-conditioning control device, 1000: air-conditioning system, 10: transmission and reception unit, 11: control unit, 12: storage unit, 13: air-conditioning data acquisition unit, 14: machine learning unit, 141: training data acquisition unit, 142: learning unit, 15: determination unit, 151: deviation degree calculation unit, 152: deviation degree determination unit, 16: estimation unit

The invention claimed is:

1. An air-conditioning control device to estimate a startup time of an air conditioner on a basis of a machine learning model which has performed, by using a training data group including a dense region and a sparse region having less training data than the dense region, learning for estimating the startup time of the air conditioner from air-conditioning data which is information regarding control of the air conditioner, the air-conditioning control device comprising:

processing circuitry
to acquire the air-conditioning data;
to determine whether or not the air-conditioning data is present in the sparse region;
in a case where it is determined that the air-conditioning data is present in the sparse region, to apply extrapolation using a non-learning model for associating the air-conditioning data with the startup time to the machine learning model, and estimate the startup time of the air conditioner from the air-conditioning data by using the non-learning model; and
to perform control to start up the air conditioner at the startup time estimated.

2. The air-conditioning control device according to claim 1, wherein
the processing circuitry acquires, as the air-conditioning data, indoor environment information indicating an indoor environment, outdoor environment information indicating an outdoor environment, and operation information indicating an operation state of the air conditioner.

3. The air-conditioning control device according to claim 2, wherein
the processing circuitry acquires the operation information including a capacity saving value of the air conditioner.

4. The air-conditioning control device according to claim 1, wherein
the processing circuitry
calculates a deviation degree of the air-conditioning data with respect to the training data, and
determines whether or not the air-conditioning data is present in the sparse region on a basis of the deviation degree.

5. The air-conditioning control device according to claim 4, wherein
the processing circuitry calculates, as the deviation degree, a distance between the air-conditioning data and the training data in a space defined by parameters included in the air-conditioning data, and
the processing circuitry determines whether or not the deviation degree is equal to or larger than a predetermined threshold, and determines, in a case where the deviation degree is equal to or larger than the threshold, that the air-conditioning data is present in the sparse region.

6. The air-conditioning control device according to claim 1, wherein
the processing circuitry performs correction for estimating an earlier startup time on an output from the machine learning model.

7. An air-conditioning system comprising:
an indoor unit;
an outdoor unit connected to the indoor unit to form an air conditioner; and
the air-conditioning control device according to claim 1 to control the indoor unit and the outdoor unit.

8. An air-conditioning control method comprising:
an air-conditioning data acquisition process to acquire air-conditioning data which is information regarding control of an air conditioner;
a determination process to determine that the air-conditioning data is present in a sparse region having a small amount of training data;
an estimation process to, based on the determination process that the air-conditioning data is present in the sparse region, apply extrapolation using a non-learning model to a machine learning model which has performed, by using the training data, learning for estimating a startup time of the air conditioner from the air-conditioning data, and estimate the startup time of the air conditioner from the air-conditioning data by using the non-learning model; and
a control process to perform control to start up the air conditioner at the startup time estimated in the estimation process.

9. A non-transitory computer readable recording medium having stored thereon an air-conditioning control program to be executed on a computer, the air-conditioning control program causing the computer to perform:
all the processes according to claim 8.

* * * * *